Jan. 5, 1965   E. M. WILSON   3,164,454
METHOD OF SEPARATING OXYGEN FROM AIR
Filed Sept. 25, 1959   5 Sheets-Sheet 1

INVENTOR.
BY E. MILTON WILSON
ATTORNEY

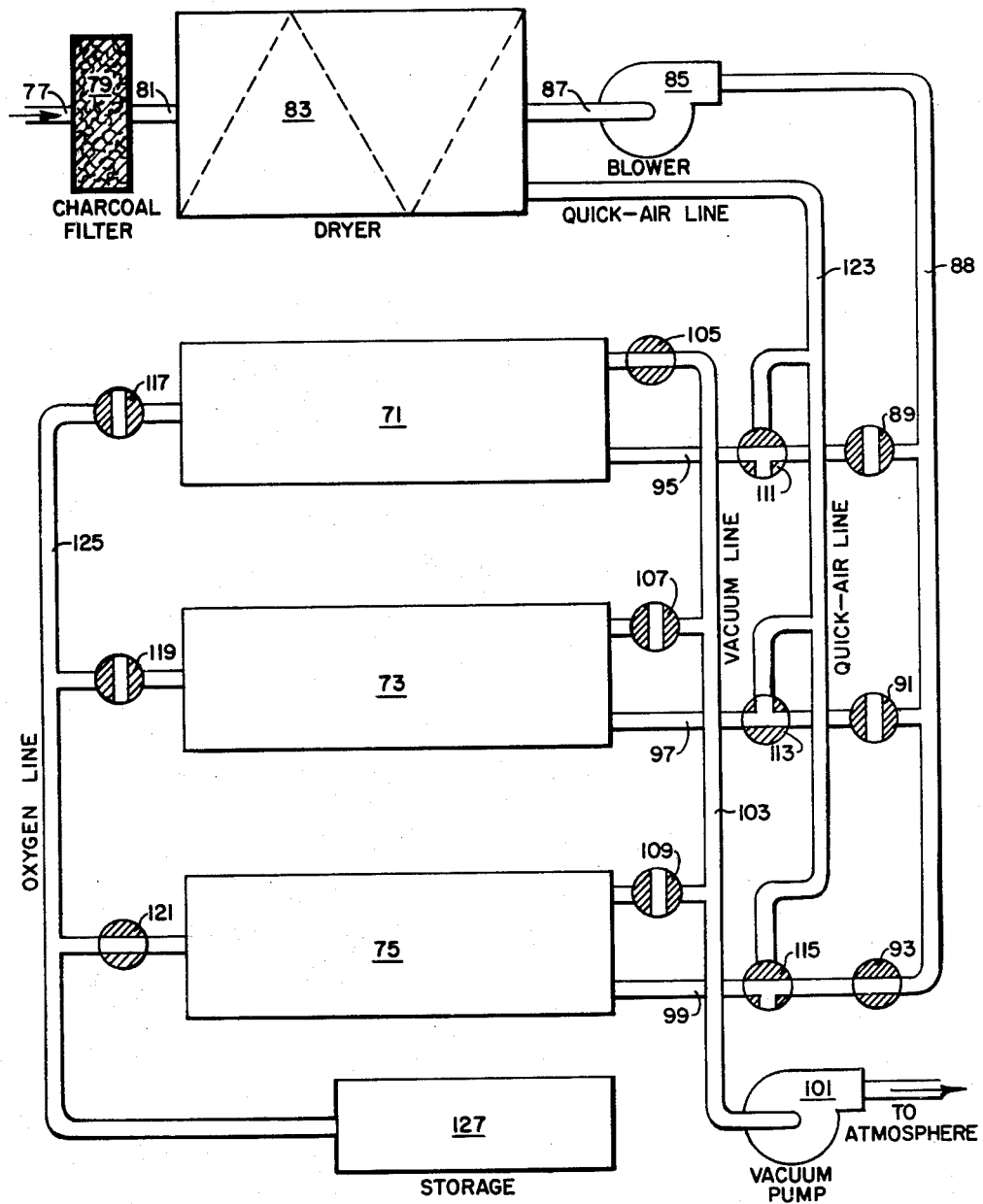

EVACUATION CYCLE

INVENTOR.
E. MILTON WILSON
ATTORNEY

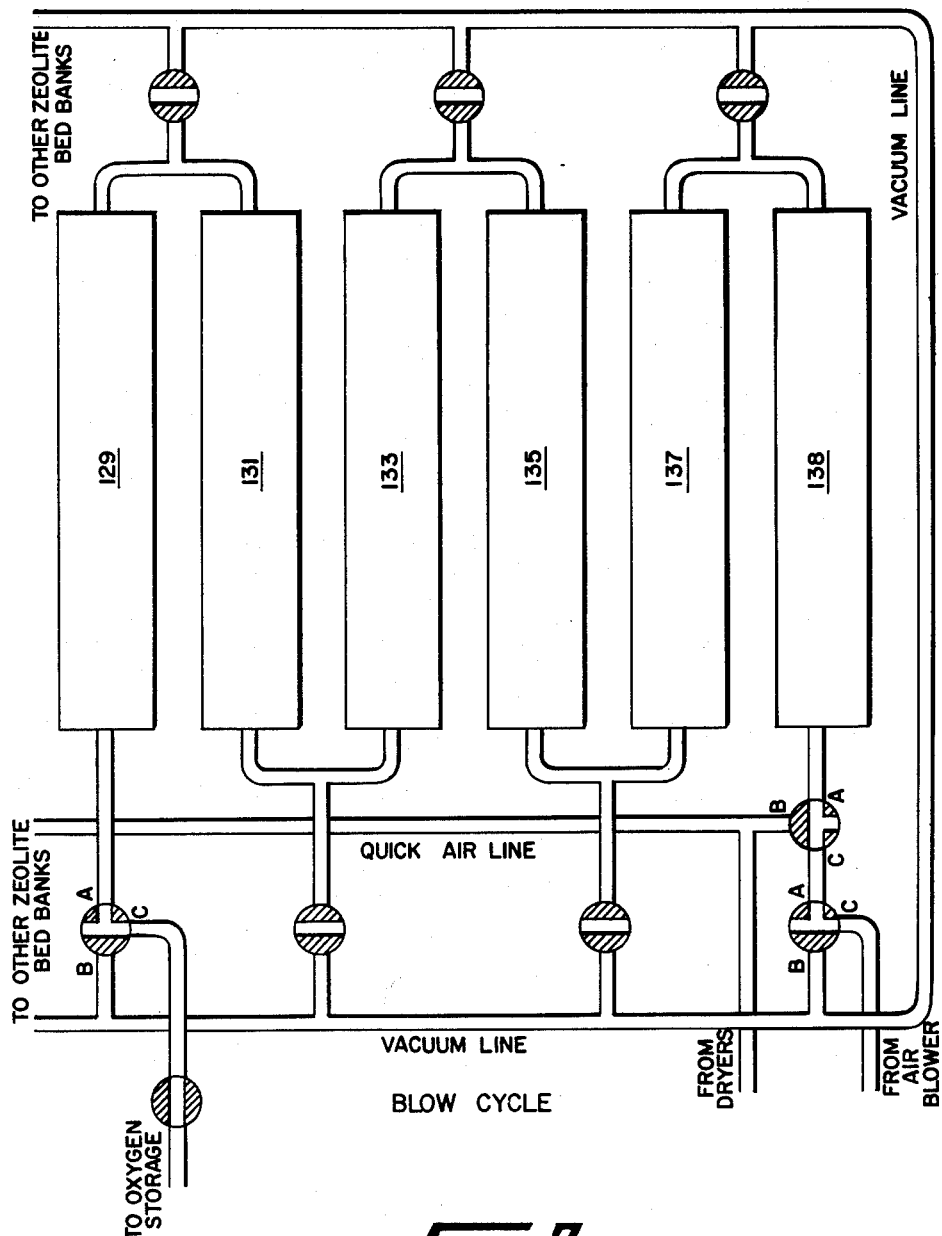
Fig 8
*INVENTOR.*
E. MILTON WILSON
BY
ATTORNEY

United States Patent Office 3,164,454
Patented Jan. 5, 1965

3,164,454
METHOD OF SEPARATING OXYGEN FROM AIR
E. Milton Wilson, Altadena, Calif., assignor to Aerojet-General Corporation, Azusa, Calif., a corporation of Ohio
Filed Sept. 25, 1959, Ser. No. 842,315
1 Claim. (Cl. 55—68)

This invention relates to a novel and practical method for separating gases. In particular, the invention relates to such a method for continuously separating oxygen from air without the necessity of resorting to extremely low temperatures.

Heretofore, oxygen has been prepared for laboratory use by thermally decomposing oxygen-rich compounds such as $HgO$, $PbO_2$, $KNO_3$, $KClO_3$, and $Na_2O_2$ and recovering the gaseous oxygen decomposition product. This technique, as normally practiced, is not economically practical for the commercial production of oxygen.

Oxygen and hydrogen are produced simultaneously when an electric current is passed through water, and where electricity is cheap and a use exists for the hydrogen this method has been used on a small scale. However, the conventional method throughout the world for the production of tonnage quantities of oxygen involves the liquefaction of air followed by fractional distillation of the liquid product. In the practice of this method, air is cooled below its critical temperature and compressed until liquefaction results, after which nitrogen and argon are distilled from the mixture leaving an oxygen product behind.

I have now discovered a relatively simple and economically practical method by means of which oxygen can be recovered from air without recourse to costly and troublesome liquefaction and distillation operations. The novel method of my invention is readily adaptable to small-scale recovery of oxygen from air with portable units that can be used in remote areas or in situations where a conventional cylinder of oxygen would be too heavy to be tolerable. The method is also suitable for use in the production of tonnage quantities of oxygen in large fixed installations. By means of this invention, oxygen can be obtained from air wherever it is needed for such purposes as the recharging of breathing tanks such as those used in submarines and aircraft and by skindivers. Oxygen can also be readily obtained by the method of my invention for manifolding to laboratories and hospitals, use in ambulances and first aid stations, remote welding applications, and for any other purpose so long as a source of air is available.

Briefly, the method of this invention comprises alternately evacuating and pressurizing with air, or other gaseous mixture to be separated, a packed bed of a crystalline zeolite material having pores of such size as to permit the gas molecules to pass through and into cavities in the zeolite crystal. So-called synthetic zeolites of this type are frequently referred to as molecular sieves. When air is forced through a crystalline zeolite bed of the type useful for this invention, the oxygen molecules pass into and through the pores of the zeolite while the nitrogen molecules are entrapped and detained within the zeolite cavities, the net result being a separation of the input air into relatively pure oxygen, which passes through the bed with little or no hindrance, and nitrogen which is preferentially entrapped within the zeolite cavities. Since only the oxygen passes completely through the zeolite bed in substantial amounts, it is not strictly correct to speak of passing air "through" such a bed. However, to avoid cumbersome language, that expression is sometimes employed herein to denote the forcing of air *into* the bed under such conditions that relatively pure oxygen issues from the other side thereof.

In practicing the method of this invention for the separation of oxygen from air, a bed of crystalline zeolite is substantially purged of any contaminating molecules present within its cavities with a vacuum pump or other suitable means, as disclosed below, and then air is forced through the bed until its cavities are substantially "saturated" with nitrogen molecules, during which time the purified oxygen is recovered as it passes through the bed. After the zeolite bed has become saturated with nitrogen it is subjected to vacuum or other treatment for removal of the nitrogen therefrom. After the nitrogen has been removed from the sieve bed, the zeolite is in regenerated form and the above-described cycle of passing air through the bed to its nitrogen saturation point is repeated. The alternate cycles of passing air through the sieve bed and then evacuating it of nitrogen is repeated as often as necessary to obtain the desired quantity of oxygen.

This invention will be better understood from the following description and the accompanying drawings of which:

Figure 6:
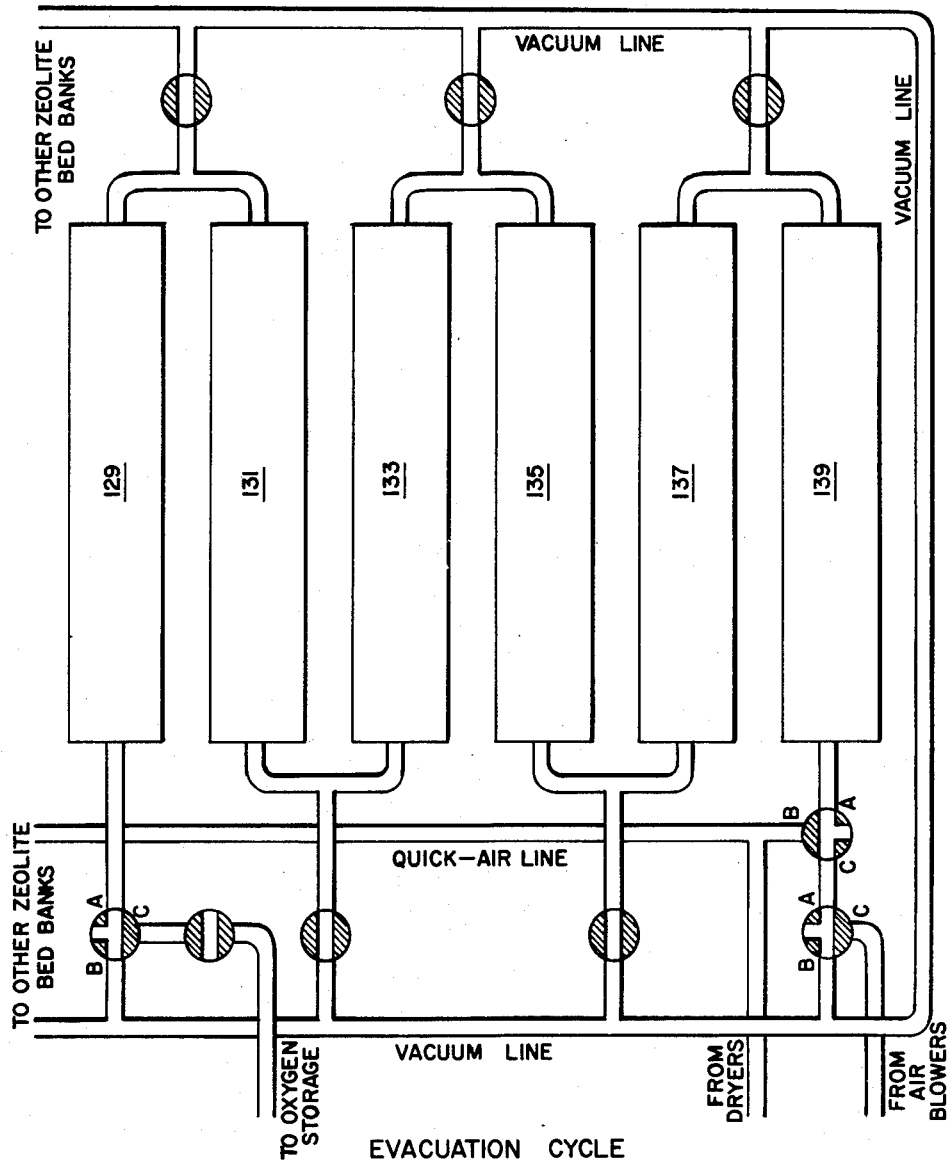
Figure 7:
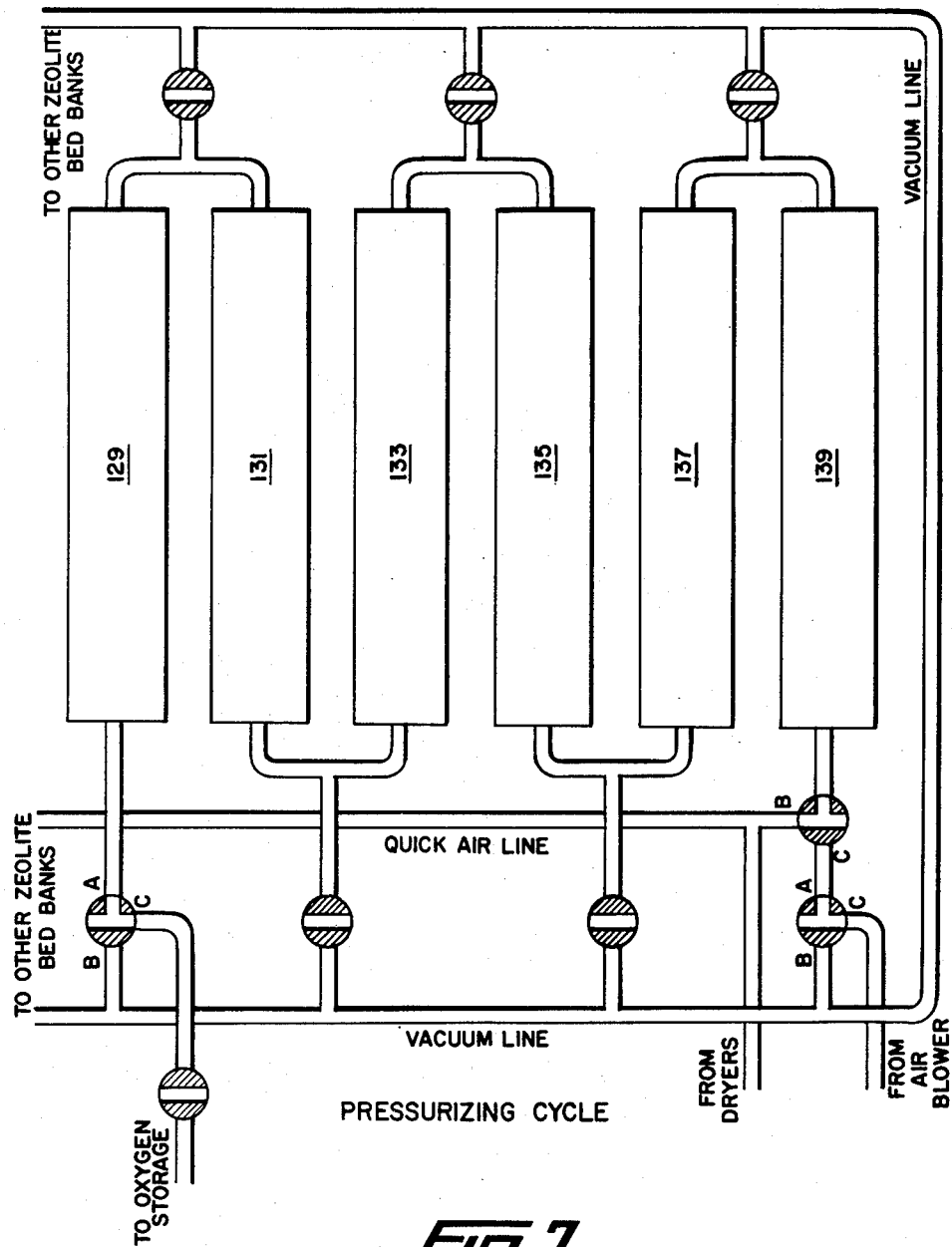

FIGURE 5 schematically shows an arrangement of parts by means of which oxygen can be continuously separated from air according to the method of this invention;

FIGURE 6 schematically shows a bank of zeolite beds which can be employed in the system of FIGURE 5, with pipe and valve arrangement suitable for evacuating the beds of entrapped nitrogen molcules therein;

FIGURE 7 shows the schematic arrangement of FIGURE 6 with valve adjustment suitable for pressurization of the beds to atmospheric pressure or thereabout; and FIGURE 8 shows the schematic arrangement of FIGURE 6 with valve adjustment suitable for the blowing of air into the feed end of the bank of zeolite beds and the removal of effluent oxygen from the exit end of said bank.

Figure 1:
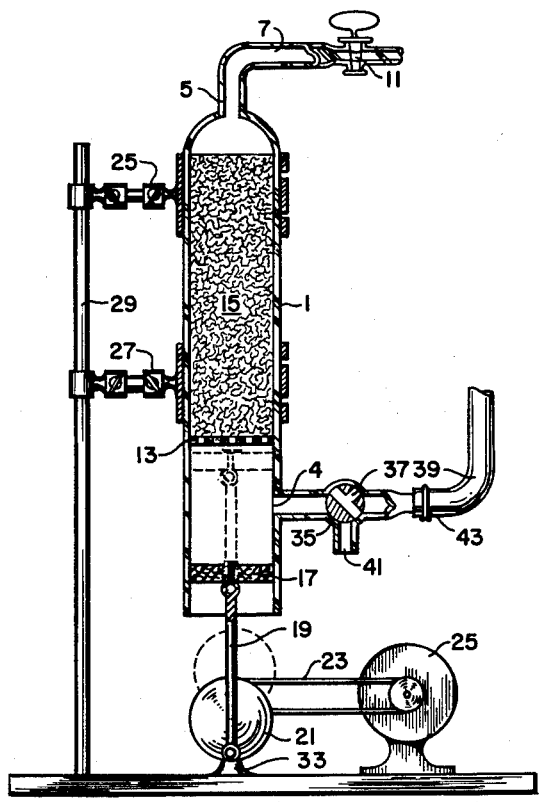
FIGURE 1 is a longitudinal view, partly in section, of a laboratory working model of an apparatus for separating oxygen from air according to the method of this invention.

Referring first to FIGURE 1, there is shown a cylindrical glass column 1, having a neck at one end as shown at 5 on the drawing and a port opening as shown at 4. Contiguous with neck 5 of glass cylinder 1, is outlet tube 7 which leads through a 90-degree bend, as shown, to a storage container, not shown on the drawing. Positioned in outlet tube 7 is stop cock 11 to control the flow of outlet gas from column 1.

Fused to the inner walls of glass column 1, in horizontal position, is sintered glass disk 13 which supports a packed bed of crystalline zeolite pellets 15. The packed bed preferably consists of $\frac{1}{16}$-inch diameter pellets of Linde Molecular Sieve Type 5A. Linde Molecular Sieve Type 5A is the trade name for a crystalline calcium alumino silicate which will be more fully identified below. The Type 5A molecular sieve has a high internal surface area (700 to 800 square meters per gram) due to numerous cavities of molecular dimensions throughout its crystal structure, connected by pores of such size as to admit molecules having a critical molecular diameter of up to about 5 A.

A laminar leather piston 17 is caused to rise and fall in column 1 by the motion of a piston rod 19, driven at a slow speed by means of eccentric 21 to which power is supplied through belt 23 from an electric motor 25. Leather piston 17 forms an air-tight seal with the inner walls of column 1.

When the apparatus is functioning, piston 17 reciprocates between a high and low position in column 1 as a result of the movement induced therein through piston rod 19 by eccentric drive 21. The high position of piston 17 and piston rod 19, as well as that of eccentric 21, is indicated by broken lines on the drawing. Column 1 is supported by clamps 25 and 27 fastened to ring stand 29, and eccentric 21 is supported by support 33.

Contiguous with column 1, there is a T-shaped glass fitting 35 providing a sealed channel between the interior of the column, through the port opening at 4, and a vacuum source, not shown, and also providing a means for the introduction of atmospheric air into the column. Positioned as shown in tube 35 is a two-way cock 37 which is manually controllable. Cock 37 can be closed to hermetically seal column 1 from the outer surroundings; adjusted to permit evacuation of the column and zeolite bed 15 through a thick-walled flexible line 39, which leads to a vacuum pump, not shown; or adjusted to permit the ingress of air into column 1 through the intake opening shown at 41 in fitting 35. Thick-walled tube 39 is fastened to fitting 35 by means of a clamp 43.

To operate the FIGURE 1 apparatus, the following step-wise procedure is observed:

A. The rise and fall movement of piston 17 in column 1 is initiated by actuating motor 25 which causes a slow reciprocal movement of said piston.

B. As piston 17 starts to fall in column 1, stopcock 11 is checked and closed if necessary.

C. When piston 17 falls below the level of the port opening at 4 in column 1, cock 37 (which has been kept closed till now) is adjusted to permit evacuation of column 1 and zeolite bed 15 through line 39, the evacuation being accomplished by means of a vacuum pump applying suction through line 39.

D. When piston 17 is at its lowest point in column 1, cock 37 is turned to shut off the vacuum and to admit atmospheric air to column 1.

E. As piston 17 rises from its lowest point in column 1, and just before it reaches the port opening at 4, cock 37 is turned to close off both the vacuum and outside air lines from the column and stopcock 11 is opened.

F. The rising piston pushes air in column 1 through zeolite bed 15, which preferentially entraps the nitrogen molecules while permitting the oxygen to pass on through the bed and out through stopcock 11 to storage.

G. As the piston starts to fall in column 1 again, steps B through F, outlined above, are repeated in the sequence given. The entire cycle of operations can be repeated as often as desired.

Figure 2:
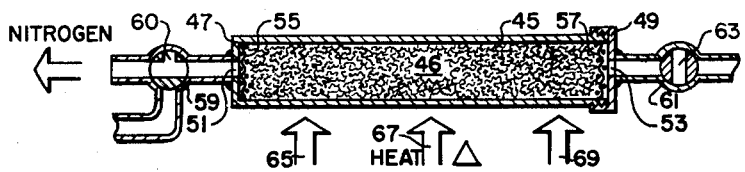
FIGURE 2 shows a sectional view of a device according to my invention being heated for purposes of desorbing nitrogen from the zeolite bed therein.
Figure 3:
FIGURE 3 shows the same sectional view as FIGURE 2 with the apparatus depicted in proper valve adjustment to permit the entry of air under pressure into the zeolite bed.
Figure 4:
FIGURE 4 shows the same sectional view as that of FIGURES 2 and 3 with proper valve adjustment to permit the exit of the oxygen effluent from the apparatus.

FIGURES 2, 3, and 4 all show the same sectional view of a device, according to my invention, by means of which nitrogen desorption of a zeolite bed is accomplished by heating means.

Turning first to FIGURE 2, there is shown a metal cylindrical container 45 having a permanent end closure 47 at one end and a screw-on closure 49 at the other end as shown. Concentrically centered in permanent end closure 47 and screw-on closure 49 are circular ports as shown at 51 and 53. Flush against permanent end closure 47 and screw-on closure 49 are circular sections of metal screen 55 and 57. Filling cylindrical container 45 is a bed of crystalline zeolite pellets 46, preferably 1/16-inch pellets. Screw-on closure 49 is hermetically sealed. Screen sections 55 and 57 are held in place by zeolite bed 46 and they, in turn, prevent particles of the zeolite from entering the ports at 51 and 53.

Sealed around the ports at 51 and 53 in the ends of cylinder 45 are valved metal fittings 59 and 61. Fitting 59 contains a two-way valve 60, which can be adjusted to permit open communication between the outer surroundings and the interior of cylindrical container 45, or to permit entry of air under pressure from a source not shown into cylindrical container 45. Valve 60 can also be closed to hermetically seal the interior of cylinder 45 from the outer surroundings. Fitting 61 contains an ordinary gas cock or valve 63 suitable for providing a passageway from cylindrical container 45 to oxygen storage means, not shown. FIGURE 2 shows valve 60 adjusted so that cylindrical container 45 is vented to the atmosphere and valve 63 is closed. When the valves are as shown in FIGURE 2 and heat from a suitable source, such as, for example, from a gas flame, is added as indicated by arrows 65, 67, and 69 to cylindrical container 45 to bring the temperature of zeolite bed 46 up to about 400° F., substantial desorption of any nitrogen molecules entrapped therein is accomplished and the nitrogen thus released is vented to the atmosphere through valve 60.

FIGURE 3 shows the same sectional view as that of FIGURE 2, except with valve 60 adjusted to admit air, under compression, into cylindrical container 45.

FIGURE 4 shows the same cross-section as that of FIGURES 2 and 3 with valve 60 closed and valve 63 open.

The device shown in section in FIGURES 2, 3, and 4 functions as follows. With the valves adjusted to the positions shown in FIGURE 2, heat is added to zeolite bed 46, as shown, whereby it is desorbed of nitrogen molecules which are vented to the atmosphere. After this desorption treatment and valve 60 is closed, sieve bed 46 is permitted to cool down and then with valve 63 closed and valve 60 adjusted to permit the entry of air under compression, from a source not shown, into zeolite bed 46 (the FIGURE 3 valve positions), the pressurized air is admitted to cylinder 45 until the pressure therein is sufficient to force effluent gas from bed 46 through valve 63 after this valve is opened. At this point valve 60 is closed and valve 63 is opened (FIGURE 4), permitting the effluent gas from bed 46 to escape from cylinder 45 to the oxygen storage means, not shown. The above-described series of operations can be repeated, in the sequence given, as often as necessary to obtain the desired quantity of oxygen-enriched effluent gas.

A continuous method of oxygen preparation is possible through utilization of the desorption heating principle described above. Such a continuous method is readily achieved by means of an apparatus in which the zeolite material is caused to travel through a closed loop with air being admitted countercurrent to its direction of travel at a proper rate so that oxygen is taken off at a fixed point and nitrogen then removed on the opposite side of the loop by heat.

FIGURE 5 illustrates in schematic form, an arrangement of apparatus by means of which a continuous output of oxygen-enriched gaseous product can be obtained from air, using the novel method of this invention. Three confined batches of a pelleted crystalline zeolite material, such as 1/16-inch pellets of Type 5A sieve, are shown at 71, 73, and 75 on the drawing. Input air to the system is drawn in through inlet line 77. The atmospheric air entering through line 77 first passes through a charcoal filter 79, in which impurities such as, the hydrocarbon impurities normally found in smog-laden atmospheres; organic fumes such as ether, alcohol, or the like, frequently present in hospital surroundings; etc.; are adsorbed by the charcoal. The air from charcoal filter 79 passes through line 81, into dryer 83, wherein moisture is substantially removed therefrom.

The valving and piping arrangement of the FIGURE 5 apparatus is such that it can be operated on a continuous 3-cycle program of evacuation, pressurization, and blowing whereby at any given time during the operation each of the batches is undergoing a different cycle from that of either of the other two batches. Thus, at all times during the operation of the apparatus, an oxygen effluent product is being produced from one of the three zeolite batches.

Dried air from dryer 83 is passed to blower 85 through line 87, from whence it is blown into the particular zeolite batch undergoing the blowing cycle at that time through conduit 88. Valves 89, 91, and 93, in lines 95, 97, and 99, which connect conduit 88 with confined zeolite batches 71, 73, and 75, respectively, are manipulated to route the air from blower 85 to the separate batches of zeolite in proper sequence.

The evacuation cycle is accomplished by means of a vacuum pump 101, which communicates with the zeolite batches by means of vacuum line 103. The sequence of evacuation is controlled through proper manipulation of valves 105, 107, and 109, positioned as indicated on the drawing.

The pressurization cycle follows the evacuation cycle in sequence, its purpose being to bring the pressure in the confined area of the zeolite batch up to atmospheric pressure or thereabouts before introducing the air under pressure from the blower into said area. For this purpose so-called quick air is bled from dryer 83 through quick air line 123. The quick air is introduced into the zeolite batches by means of two-way valves 111, 113, and 115, which tie the quick air line into lines 95, 97, and 99, respectively.

Oxygen effluent from zeolite batches 71, 73, and 75 passes through oxygen line 125 to storage at 127, as shown on the drawing. Proper manipulation of valves 117, 119, and 121 controls the sequence of effluent flow from zeolite batches 71, 73, and 75, respectively. All valves indicated on FIGURE 5 are solenoid controlled and programmed to assure proper functioning of the apparatus when in operation.

The valve adjustments indicated in FIGURE 5 illustrate the adjustments obtaining while zeolite batch 71 is undergoing evacuation, zeolite batch 73 is undergoing pressurization, and batch 75 is being subjected to the blowing cycle.

Zeolite batches 71, 73, and 75 can comprise single beds of zeolite or banks of zeolite beds, such as, for example, multiple tubular beds of zeolite, which function as a unit bed in the system. Where such banks of beds are employed as zeolite batches 71, 73, and 75 of FIGURE 5, the individual beds of each bank are simultaneously subjected to the appropriate evacuation, pressurization, or blowing cycles and thus the bank serves in the same manner as would a single unit bed.

Various modifications obvious to those skilled in the art can readily be made in the system of FIGURE 5. For example, a bleed valve can be inserted in conduit 88 and fitted to a return line to dryer 83 in order to utilize air from blower 85 for purposes of regenerating the dryer, if desired. Also meters for measuring gas flow can be inserted in any of the lines, such as, for example, in oxygen line 125, if such metering appears to be warranted.

FIGURES 6, 7, and 8 are illustrative of a bank of six zeolite beds which can be employed as one of the three zeolite batches of FIGURE 5. In actual operation each of the three zeolite batches of FIGURE 5 preferably comprises a bank of six tubular beds such as that schematically illustrated by FIGURES 6, 7, and 8.

FIGURES 6, 7, and 8 show six separately supported and confined beds of a suitable zeolite material 129, 131, 133, 135, 137, and 139, the confining and supporting means for the six beds comprising six hermetically sealable metal tubes. Valving and piping arrangements whereby the six beds can be evacuated, pressurized with quick air, or subjected to air from a blower are shown and are self-explanatory. All of the valves are solenoid valves which are so programmed as to assure the proper functioning of the six-bed bank as one of the zeolite batches in the FIGURE 5 system. FIGURE 6 shows the valve adjustments which will obtain during evacuation of the beds; FIGURE 7 shows the valve adjustments for pressurization of the beds with quick air; and FIGURE 8 shows the valve positions which permit air to be blown from the blower through the zeolite beds.

The preferred crystalline zeolites for use in my invention are those natural or synthetic zeolites having pore openings of such size as to admit molecules up to about 5 A. in critical diameter. It should be pointed out that in order to admit molecules of 5 A. critical diameter it is not necessary for the pore openings of a zeolite to have effective diameters of this size since it has been discovered that at ordinary temperatures molecules up to 0.5 A. wider than the free diameter of the pore can pass through it easily. Molecules larger than this have greater difficulty entering the pore and those of 1 A. or more wider than the opening cannot get through at all. It is important to note that the *effective* diameter, rather than the actual one, is critical in determining whether a molecule of a given size will pass through a zeolite pore. The effective pore size is not necessarily the same as the actual size of the opening due to the fact that many times cations present in the crystalline lattice are so positioned as to partially block this opening.

While the preferred crystalline zeolites for use in my novel method are those capable of admitting molecules having critical diameters of up to 5 A., the invention is not limited to the use of these particular zeolites and others can be employed within the scope of my invention. It is obviously essential that for a crystalline zeolite to be suitable for use in this invention its pores must be at least large enough to admit both nitrogen and oxygen molecules, which have critical diameters of 3 and 2.8 A., respectively. I have discovered, moreover, that for practical purposes is is best to employ crystalline zeolites initially having pore openings at least large enough to admit molecules of about 5 A. critical diameter since I have found it difficult or impossible to obtain satisfactory results with zeolites of pore size smaller than this without first subjecting them to rigorous activation treatments, such as, for example, high temperature heat treatment.

A particularly useful crystalline zeolite for purposes of this invention is that available commercially under the name Linde Molecular Sieve Type 5A, hereinafter referred to as Type 5A sieve, which has pore openings of such size as to admit molecules of up to 5 A. critical diamter. Type 4A sieve is a calcium-exchanged form of a sodium zeolite manufactured and sold by Linde Company, Division of Union Carbide Corporation, of New York, as Molecular Sieve Type 4A (hereinafter referred to as Type 4A sieve) in which about 75 percent of the sodium ions have been replaced by calcium ions. Both Type 4A and Type 5A sieves will be more fully described below.

Crystalline zeolite structures can be described as frameworks of $AlO_4$ and $SiO_4$ tetrahedra linked at their corners. Electrical neutrality of the crystal is achieved normally by the presence of exchangeable alkali or alkaline earth ions such as sodium, potassium, calcium, barium, etc., ions which make up the charge deficit inherently present in the three-dimensional network of $SiO_4$ and $AlO_4$ tetrahedra. The exchangeable ions attach themselves loosely to the oxygens at the corners of the tetrahedra. The zeolite structure is honeycombed with cavities which connect with adjacent cavities through pores of a fixed size depending on the variety of zeolite involved. The shape and size of the cavities likewise depend on the variety of the zeolite in which they are found.

Zeolites have a great affinity for water and those recovered from natural deposits such as, for example, chabazite have their cavities filled with water molecules.

Before zeolites can function properly as molecular sieves at least some of the water molecules present in the cavities, and preferably all of them, must be removed to make space so that other molecules can get into these cavities during the sieving operation. Such water can be reversibly removed from zeolites by merely heating the material to a temperature sufficiently high to accomplish the purpose.

Molecular sieves are conventionally used for the separation of mixtures of substances having molecules of different sizes. To be effective in separating the components of such a mixture, the pores of the molecular sieve must be of such size as to permit only the smaller molecules in the mixture to enter. Molecules which enter zeolite cavities are tenaciously adsorbed and thus a separation of the mixture into molecules of different size fractions is effected, the smaller molecules becoming entrapped in the zeolite cavities and the larger ones remaining free of such entrapment and easily recoverable. A typical example of the conventional use of a zeolite as a molecular sieve can be found in the separation of a mixture of normal octane and iso-octane with a calcium zeolite having pores of a size selected to admit molecules up to 5 A. in critical diameter (such as Linde Molecular Sieve Type 5A). In this operation, the long, slender, normal, octane molecules easily enter the pores of the zeolite but the iso-octane molecules are too wide to pass through these openings. Consequently, the normal octane enters the zeolite pores and is, in effect, "sieved" from the mixture, leaving the iso-octane behind in purified form as the desired product.

I have now discovered that oxygen and nitrogen molecules, which have roughly the same critical diameters (2.8 A. and 3 A., respectively) can be separated at room temperature by passing them through a molecular sieve preferably having pores of such size as to admit molecules of up to 5 A. in critical diameter. This discovery was of great importance in that it made possible the recovery of oxygen from air at room temperature by the simple expedient of passing the air through a crystalline zeolite of suitable pore size. In effecting a separation of oxygen from nitrogen according to this invention, the zeolite does not function as a conventional molecular sieve since the oxygen and nitrogen molecules are so nearly the same size that they both pass through the pores of the zeolite and hence there is no true "sieving" mechanism (such as in the separation of normal octane from iso-octane) involved.

Although the theory of the novel separating mechanism of this invention is not completely understood, it is felt that the efficacy of the invention depends on the relative energies of the system, that is the relative activation energies of the gas molecules entering the zeolite pores and the thermal energy of the zeolite itself. Starting from this premise, it can be postulated that the activation energy of oxygen bears such relationship to the thermal energy of zeolite that it is only momentarily (if at all) adsorbed as it passes through the zeolite cavities whereas the activation energy of nitrogen is such that it is tenaciously adsorbed on the inner walls of the zeolite cavities and thus prevented from passing on through the crystal zeolite structure as does oxygen.

It has been explained above that the preferred zeolites for purposes of this invention are those crystalline zeolites having pores of such size as to admit molecules having critical diameters of at least 5 A. By this it is meant that the pores should preferably not be smaller than that size capable of admitting molecules of 5 A. critical diameter although they can be larger than this.

There are a great number and variety of both natural and artificial crystalline zeolites. All of these crystalline zeolites are distinguished by an AlO₄—SiO₄ framework, but they differ from each other in the type of exchangeable ions present in the crystal lattice, which ions, as explained above, serve to bring about electrical neutrality of the zeolite. The exchangeable ions found in zeolites are normally the alkali and alkaline earth ones such as sodium, potassium, calcium, strontium, barium, lithium, rubidium, etc., ions, but they are not limited to this class of materials. For example, both silver and thallium zeolites, which contain silver and thallium ions, respectively, have been prepared in the laboratory.

A crystalline zeolite may contain only one type of exchangeable ion or it may have two or more types of these ions incorporated in its crystal lattice. The zeolites having two or more of the alkali and alkaline earth metal ions present are quite common and, in fact, the crystalline zeolite which I have found most suitable for purposes of this invention is of this type, containing both calcium and sodium ions. Many of the crystalline zeolites are naturally occurring such as, for example, mordenite, chabazite, erionite, fanjasite, and gismondite. On the other hand, many varieties of synthetic crystalline zeolites have been prepared in the laboratory and have no natural occurrence, of which the zeolite most suitable for this invention is an example.

As explained above, the crystalline zeolite found to be most useful for the method of this invention is Type 5A sieve or, as it is known commercially, Linde Molecular Sieve Type 5A. Also, as explained above, Type 5A sieve is a calcium-exchanged form of Type 4A sieve, a sodium zeolite in which about 75 percent of the sodium ions have been replaced by calcium ions. The average oxide ratios for Type 4A sieve is

Type 4A and also Type 5A sieve have a cubic crystal structure with a unit cell dimension of 12.32 A. and the space group is

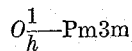

characterized by a three-dimensional network of alternating AlO₄ and SiO₄ tetrahedra, twelve of each per unit cell. In the Type 4A sieve the interstices are occupied by twelve sodium ions.

The aluminosilicate framework of both the Type 4A and Type 5A sieves is based on units which contain four AlO₄ and four SiO₄ tetrahedra in a rigid compact group. These units link together to form a ring of eight oxygen atoms in the center of each face of the unit cell and an irregular ring of six oxygen atoms at each corner on the threefold axis. In the center of the unit cell is a large cavity, 11.4 A. in diameter, which is connected to six like cavities by the eight-membered rings which form restricted openings 4.2 A. in diameter. In addition, the large cavity is connected to eight small cavities 6.6 A. in diameter by the six-membered rings which produce openings 2.0 A. in diameter. There are two interconnecting pore systems, one consisting of 11.4 A. cavities separated by 4.2 A. pores and the other 11.4 A. cavities alternating with 6.6 A. cavities separated by 2.0 A. pores. In the Type 4A sieve sodium ions occupy positions in the center of the six-membered rings. Four remaining sodium ions in the unit cell occupy positions in or adjacent to the 4.2 A. holes.

Although the *true* pore size of both Type 4A and Type 5A sieves is the same (4.2 A.), the *effective* pore size of the former is different from that of the latter as a result of the difference in types of exchangeable ions in the two zeolites. Thus, the Type 4A sieve has an effective pore size such as to permit only molecules smaller than or equal to about 4 A. in critical diameter to enter its cavities, whereas Type 5A sieve will admit molecules up to about 5 A. in critical diameter. In view of the fact that both oxygen and nitrogen atoms are substantially smaller than 4 A. in critical diameter (as pointed out above, oxygen and nitrogen have critical diameters of 2.8 and 3 A., respectively), it would be expected that Type 4A sieve would be an ideal zeolite for separating mixtures of those gases by the method taught herein, but this was not found to be the case. Thus, it was found that unless Type 4A sieve is first subjected to a heat treatment much more rigorous than that necessary to remove any moisture present (or other treatment to accomplish the same result), it has no practical usefulness insofar as the present invention is concerned. It is not known what change is effected in the Type 4A sieve as a result of this harsh heat treatment.

An example of a crystalline zeolite other than Type 5A sieve which is suitable for the recovery of oxygen from a mixture of oxygen and nitrogen when employed in the method of this invention, is that available commercially under the trade name Linde Molecular Sieve Type 13X, a product manufactured and sold by Linde Company, the same company that makes Molecular Sieve Type 4A and Molecular Sieve Type 5A. Hereinafter this particular zeolite will be referred to as Type 13X sieve.

Type 13X sieve has the X crystal structure which is cubic. The unit cell dimension is 24.95 A. and the space group is $$O_h^7 - Fd3m$$

characterized by a three-dimensional network with mutually connected intracrystalline cavities accessible through pore apertures which will admit molecules with critical dimensions up to about 13 A. The void volume is 51 percent of the zeolite volume. Type 13X sieve is a sodium zeolite having the general chemical formula shown below in its anhydrous form:

$$0.83 \pm 0.05 \ Na_2O \cdot 1.00 \ Al_2O_3 \cdot 2.48 \pm 0.03 \ SiO_2$$

The effect of temperature in my novel method is not critical except at extremely low temperatures such as the temperature of liquid air. However, my invention comprises a method for separating *gases* and thus temperatures low enough to liquefy these gases are not contemplated as being within the scope of the invention. For most practical purposes, the method of this invention is carried out while maintaining the zeolite bed temperature at room temperature or thereabouts.

The degree of evacuation of the zeolite bed in the nitrogen desorption cycle is an important variable since the greater the vacuum the higher the purity of the resultant oxygen. The optimum case is when the sieve is evacuated to a vacuum in the order of 1 to 2 mm. of Hg, but for practical purposes 50 to 100 mm. will normally suffice. As explained above, it is not necessary to remove the nitrogen from the zeolite material by a vacuum pump technique, any method of accomplishing removal of the nitrogen being suitable for the purpose. For example, heating the bed to an elevated temperature, such as approximately 400° F., with the bed area vented to the atmosphere has been found to effect removal of nitrogen therefrom and is thus within the scope of my invention.

I have constructed and tested an apparatus such as that illustrated in FIGURES 3 through 6 having three zeolite batches, as shown in FIGURE 3, each batch being confined in six metal tubes 24 inches long and having an inside diameter of 1½ inches. Each of the tubes was filled with 1/16-inch pellets of molecular sieve Type 5A. The apparatus was operated under such conditions as to produce roughly five liters per minute of a gaseous product which was found to contain 80–90 percent oxygen. By various devices, such as operating a number of sieve beds in series, temperature control of the beds, etc., the purity of product can be adjusted to substantially any extent desired and consequently the above purity of 80–90 percent is representative only of the results of the particular procedure described.

It is preferable, where possible, to locate the vacuum outlet for exacuating a zeolite bed at the same end of the bed as that at which the air enters it rather than at the other end, the primary reason for this being to reduce the path of desorption of the nitrogen therefrom as much as possible.

The particular size of the zeolite particles is not critical but it is believed that beds containing smaller particles such as, for example, 1/16-inch pellets (as compared to larger particles such as 1/8-inch pellets) result in greater enrichment of the product in oxygen, when used in my novel method, because of the greater surface area and consequent increased ability of the particles to retain the nitrogen. However, the limiting factor as to bed particle size is the ability to desorb or remove the gases entrapped in the bed. Thus, with smaller particles it is in some instances necessary to increase the time of the evacuation cycle to attain satisfactory enrichment of the product in oxygen content due to the inability to achieve such enrichment during shorter evacuation cycles.

It has been determined that regardless of the gas flow rate through a zeolite bed the total quantity of purified oxygen is the same for a particular bed configuration. To illustrate with a specfic example, assume in the first instance a flow rate of 60 cc./min. of air entering a zeolite bed to yield a total of 600 cc. of purified oxygen over a period of ten minutes. Then, in the second instance, if the entering flow rate of the air were 1200 cc./min., the same 600 ccs. of purified oxygen would be attained, but this time it would be accomplished in only half a minute.

Following is a description of an example in which oxygen was separated from air with two zeolite beds, according to the method of this invention. It should be emphasized that the present invention is not limited to the particular method of this example.

Example

Two molecular sieve beds of 1/16-inch pellets of Type 5A sieve were assembled. Air was cyclically forced through these beds, the complete cycle time being two minutes, consisting of a 50-second evacuation time and a 50-second flow time for each bed. A ten-second free pressurization period was allowed for entry of air into the beds after evacuation thereof. During the pre-pressurization period the exit end of each bed was closed off to prevent the sucking of air into the bed from that end. This two-bed system did not produce a continuous supply of oxygen, the flow being closed off for ten seconds, as explained, in each minute.

The valving for the two-bed system of this example consisted of solenoid operated valves actuated by means of a switching system using a 0.5 r.p.m. synchronous motor with three adjustable cams which activated an arrangement of four single-pole, double-throw, leaf-actuated micro switches. In the automatic operation of the two-bed system, oxygen purities ranging from 70 to 90 percent were obtained during an operation time of approximately eight hours.

The two zeolite beds were supported in tubes 120 centimeters long having a diameter of 17 mm.

The novel separation method of this invention, as indicated above, is not limited to use in the separation of oxygen from air, and any other mixture of gases having molecules similar in physical dimensions and relative adsorption energy to the molecules found in air can also be separated as taught herein. Thus, for example, the system can be employed for separating such gas mixtures as the carbon dioxide-air mixtures found in submarines and for the isolation of helium from mixtures of helium and natural gas.

I claim:

A method of separating oxygen from air which comprises: alternately forcing the air into a bed of crystalline zeolite material having pore openings at least large enough to admit molecules having a critical diameter of about 5 A., while operating said bed at substantially normal atmospheric temperature whereby the oxygen molecules in the air are forced through the cavities in the bed and the nitrogen molecules are entrapped within said cavities, and substantially freeing the zeolite bed of the nitrogen molecules entrapped therein.

References Cited in the file of this patent
UNITED STATES PATENTS

| | | |
|---|---|---|
| 2,810,454 | Jones et al. | Oct. 22, 1957 |
| 2,882,243 | Milton | Apr. 14, 1959 |
| 2,882,244 | Milton | Apr. 14, 1959 |
| 2,944,627 | Skarstrom | July 12, 1960 |